UNITED STATES PATENT OFFICE.

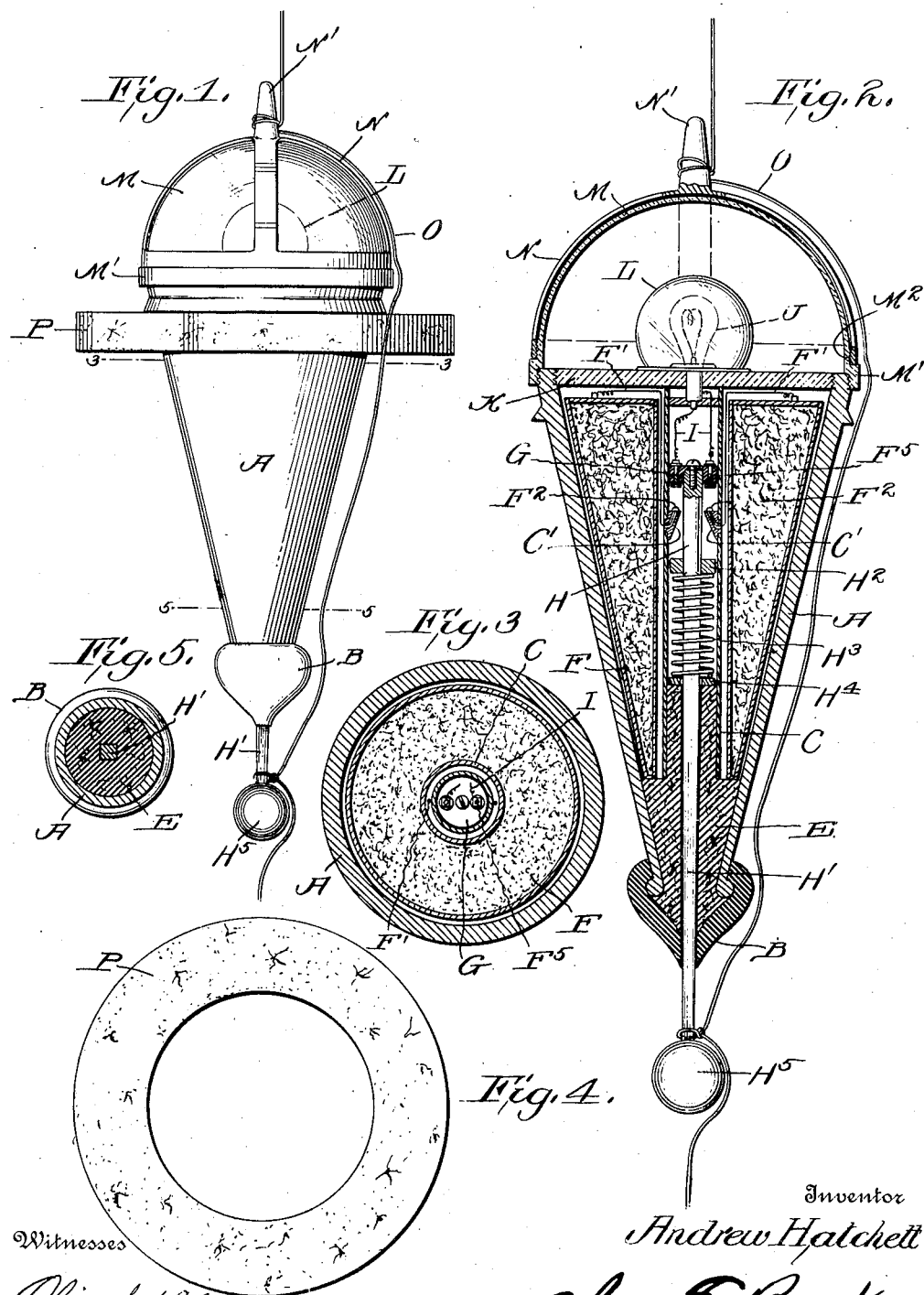

ANDREW HATCHETT, OF LOUISVILLE, KENTUCKY.

COMBINED FISHING-FLOAT AND FLASH-LIGHT.

989,145.  Specification of Letters Patent.  Patented Apr. 11, 1911.

Application filed June 10, 1910. Serial No. 566,209.

*To all whom it may concern:*

Be it known that I, ANDREW HATCHETT, a citizen of the United States, residing at Louisville, in the county of Jefferson and State of Kentucky, have invented a new and useful Improvement in a Combined Fishing-Float and Flash-Light, of which the following is a specification.

This invention relates to a combined fishing float and flash light, the object being to provide a fishing float with an electric lamp which is adapted to be lighted so as to notify the fisherman when a fish has been caught by the pulling on of the line, whereby night fishing is greatly facilitated.

Another object of the invention is to provide a fishing float which can be used as a flash light by the fisherman around the camp or wherever desired by simply removing a portion of the same.

A further object of the invention is to provide a fishing float in which an electric battery and an electric light is installed therein in such a manner that when the line connected thereto is drawn on by a fish biting, a circuit will be completed so that a light will be flashed in order to notify the fisherman.

A still further object of the invention is to provide a fishing float which is exceedingly simple and cheap in construction and one in which the parts are so mounted and connected together that a very durable float is formed.

Another object of the invention is to provide a float with a circuit closer which is normally held open by a spring and is operated by the fishing line so as to complete the circuit.

With these objects in view, my invention consists in the novel features of construction, combination and arrangement of parts, hereinafter fully described, and pointed out in the claims.

In the drawings forming a part of this specification: Figure 1 is a side elevation of my improved fishing float showing the same in use. Fig. 2 is a vertical section through the same. Fig. 3 is a transverse section taken on line 3—3 of Fig. 1. Fig. 4 is a plan view of the additional cork or float. Fig. 5 is a section taken on line 5—5 of Fig. 1.

In carrying out my improved invention, I employ a conical shell A, which is formed of any suitable light material and is provided with an internally and externally threaded upper end, and an opened lower end, which is closed by a rubber cap B. The casing or shell A, is provided with a central tube C, the lower end of which is arranged over a tubular body of packing material E, seated in the lower end of the shell A, in such a manner that a water tight joint will be formed as will be hereinafter fully described.

Arranged within the shell A, is a conical battery F, provided with a central vertical opening through which the tube C, is adapted to pass in order to hold the battery in its proper position, so as to prevent the same from moving in any way, and said battery has wires F', extending from its poles, which pass through insulating members $C'$ secured in the opposite walls of the tube C, and are connected to rounded contacts $F^2$.

Slidably mounted within the tube C is a circular head G, of a rod H, which is provided with a squared lower portion H', which extends out through the packing material E and cap B so as to prevent the head from turning, and it will be seen that by surrounding the lower portion of the rod H with packing material, water will be prevented from passing up through the same into the interior of the shell. The rod H is provided with a collar $H^2$ which bears against a coil spring $H^3$ surrounding the same, and said spring is seated on a washer $H^4$ secured within the tube C, so that the head will be held in the position shown in Fig. 2, and yet be capable of moving against the tension of the spring, as will be hereinafter fully described.

The circular head G, of the rod H, is provided with vertical bolts $F^5$, the ends of which are concaved forming contacts adapted to co-act with the rounded contacts $F^2$, so as to complete the circuit and said bolts carry wires I, which are connected to an electric lamp J, which is secured within a disk K, threaded into the end of the casing A, and said electric light is surrounded by a globe L, which is secured in position thereon by any suitable means. It will be seen that by this construction, when the rod H is drawn downwardly within the tube C, so as to bring the contacts $F^5$, into engagement with the contacts F², the circuit will be completed from the batteries to the lamp which will cause the lamp to flash.

Arranged over the upper end of the float is a semicircular globe M, which is provided with a threaded flange M', which is screwed over the externally threaded end of the shell A, so as to form a water tight joint, and said globe is provided with a threaded portion M², over which is adapted to be screwed a guard N, which is provided with a stem N' to which the fishing line O, is adapted to be connected, and said fishing line passes down alongside of the shell, and is connected to the rod H, which is provided with a head or ball H⁵ at its lower end for preventing the line from slipping off, and it will be seen when the line is jerked by a fish biting at one of the hooks, the rod will be pulled downwardly so as to draw the contacts into engagement with each other, and complete the circuit so as to cause the lamp to flash and notify the fisherman that he either has a bite, or a fish has been caught.

The float is so constructed that it will be held in its proper position on the water when in use, so that when the fish bites at one of the hooks of the line, the same will not be drawn under the water as the rod will yield so as to bring the contacts into engagement with each other, and when it is desired to use an extra heavy line, an additional circular cork P is used, which surrounds the shell and engages shoulders A', formed thereon, so as to hold the same in its proper position, and it will be seen that when a float is provided with an additional cork member, as shown, the same will be held on the surface of the water in its proper position so that an extra heavy sinker can be used on the line.

The operation of my improved float is as follows: Supposing that the same is in position on the water and the line is connected thereto in the ordinary manner of connecting a line to a float, when the line is pulled on by a fish biting instead of the float sinking in the water, the rod within the same will be drawn downwardly so as to complete the circuit which causes the light to flash and notify the fisherman that he has a bite or has caught a fish, and it will be seen that a float so constructed can be used at night with great advantages when it is impossible to see the float, as it is only necessary to watch the water until the flash is seen, and by drawing on the line the fisherman can tell whether he has either a bite or has caught a fish.

When it is desired to use the float as a flash light, it is only necessary to remove the guard by unscrewing the same, and it will be seen that the float can be readily grasped by the hand, and by pushing or drawing outwardly on the rod, a circuit will be completed so as to cause the light to glow, and it will be seen that this device can be used with great advantage by a fisherman going to or coming from the fishing ground and around the camp.

From the foregoing description it will be seen that I have provided a combined fishing float and flash light which is so constructed that a light will be flashed when the same is used as a fishing float, when the fishing line is pulled on by the fish biting whereby the float can be used at night for fishing and it will be seen that at the same time the float can be readily detached from the line, and used as a flash light, thereby combining two articles in one which are essential to each other.

What I claim is:

1. A fishing float having an electric lamp arranged thereon, a battery arranged in said float, and a circuit closer completing the circuit between said battery and lamp, said circuit closer being operated by the fishing line.

2. A fishing float having an electric lamp arranged thereon, a battery arranged within said lamp, contacts connected to the poles of said battery, a slidably mounted head provided with contacts adapted to coact with the first mentioned contacts, said contacts being connected to said electric lamp, said slidable head being operated by a fishing line.

3. A fishing float having an electric lamp and a battery, and means operated by the fishing line for completing the circuit from said battery to said lamp.

4. A fishing float comprising a hollow body having an electric battery arranged therein, a lamp arranged on the top of said body, a rod slidably mounted within said body connected to said lamp and provided with contacts, contacts connected to the poles of said battery, said rod extending out through the lower end of said body forming means for moving said rod so as to close said contacts.

5. A fishing float comprising a shell having a central tube, a battery provided with a central opening arranged in said shell around said tube, contacts carried by the tubes connected to the poles of the battery, a spring actuated rod provided with a head slidably mounted within said tube, and provided with contacts co-acting with the first mentioned contacts, an electric lamp connected to said last mentioned contacts, said rod being adapted to be connected to the fishing line, whereby said contacts will be brought into engagement with each other when the line is pulled.

6. A combined fishing float and flash light comprising a conical shell having an internal and external threaded upper end, and an opened lower end, a rubber cap for closing the lower end of said shell, a tubular body of packing material arranged within the lower end of said shell, a central tube arranged over said packing material, a conical battery provided with a central opening arranged over said tube, contacts carried by said tube connected to the poles of the battery, a rod provided with a head slidably mounted within said tube, said rod extending through the packing material and cap, a coiled spring surrounding said rod within said tube, contacts carried by said head coacting with the contacts of said tube, a disk arranged within the threaded upper end of said shell, and an electric lamp seated in said disk connected to the contact of the head, a globe arranged over the upper end of said shell, and a guard arranged over said globe.

ANDREW HATCHETT.

Witnesses:
HARRIET A. HATCHETT,
W. L. RICKS.